3,216,983
REACTION PRODUCTS OF POLYVINYLPYRROLIDONE COMPOUNDS AND POLYISOCYANATES
Morris V. Shelanski, Gulph Mills, and Theodore Levenson, Wyndmoor, Pa., assignors to Industrial Biology Laboratories, Inc., Philadelphia, Pa., a corporation of Pennsylvania
No Drawing. Filed Oct. 23, 1961, Ser. No. 147,068
5 Claims. (Cl. 260—88.3)

This invention relates to relatively water-insoluble products containing as the essential element a reaction product formed by the reaction of polyvinylpyrrolidone or polyvinylpyrrolidone/vinyl acetate copolymer and polyisocyanates.

Polyvinylpyrrolidone, generally referred to as PVP, is a water-soluble, hygroscopic material which is characterized by marked detoxifying properties whereby it binds various toxins, viruses, dyes, potent drugs and the like to reduce their toxicity and irritation and, in the case of the drugs, to simultaneously prolong their activity. It forms water-soluble complexes with germicidal agents such as the halogens whereby the toxicity of the halogens is reduced while their germicidal properties are retained. It is, therefore, useful for purifying the water of springs, wells, reservoirs, streams and the like.

PVP is also capable of complexing or cross-linking with polyacids such as polyacrylic and tannic acids and their derivatives, whereby it may be used for the clarification of such beverages as beer, wine, whiskey, fruit juices and the like.

However, in all the above and other utilities, PVP remains water-soluble so that it goes into aqueous solution. Since it is in solution, if in running water such as a stream, it will flow away and require constant replenishment, while, if in a beverage, it will not only require replenishment as it is consumed with the beverage but it also forms a contaminant therein.

The polyvinylpyrrolidone/vinyl acetate copolymer, generally referred to as PVP/VA, is also a water-soluble, hygroscopic resin which has distinctive adhesive and film-forming properties. This type of resin has specific affinity for smooth surfaces such as wood, glass, paper, metal, hair and skin and the films formed thereby are generally featured by adhesiveness, transparency, luster, hardness and water-rewettability. However, although these characteristics make this material highly valuable for non-permanent products where easy removability by water is a requirement, such as adhesive bandages, certain cosmetics and pharmaceuticals, shampoos, certain agricultural sprays and similar products, the water-rewettability characteristic makes this otherwise highly qualified material unsuitable for permanent or semi-permanent type adhesives, coatings and the like where exposure to the elements, and particularly water, is a factor. It also makes them unsuitable for cosmetic, hygienic and other personal uses where the action of water or saliva will destroy its effectiveness, as for example, in nail polish, certain hair sprays, dental composition, etc.

It has now been discovered that if anhydrous polyvinylpyrrolidone (PVP) or the polyvinylpyrrolidone/vinyl acetate copolymer (PVP/VA) is reacted under certain conditions with polyisocyanates, a product is formed which has many of the most desirable properties of the original PVP or PVP/VA while being non-hygroscopic and either completely or partially water-insoluble in accordance with the particular reactants used. Furthermore, some of the products obtained, particularly from the PVP/VA, are not only insoluble in water but also insoluble in all commonly-known organic solvents so that they can be used for various purposes where exposure to such solvents is a problem, such as linings for containers, packing for pipes used in the chemical industry, etc. The completely insoluble reaction products are also effectively used as organic abrasives for dentrifices while the essentially cold-water insoluble products are especially adapted for use in finger-nail polishes and the like where the polish is characterized by a firm adherence to the nails when subjected to either abrasion or the action of water. No deleterious side reactions occur when this polish is used.

The PVP/VA may be utilized in various proportions of the polyvinylpyrrolidone relative to the vinyl acetate. The copolymer is commercially available in the following proportions of PVP/VA: 70/30, 60/40, 50/50, 45/55, and 30/70. The particular proportions preferred depends on the particular intended use of the resultant reaction product.

The preferred polyisocyanates for purposes of the present invention are those having two NCO groups (diisocyanates). Various types of diisocyanates useful for the present purpose are commercially available under the name "Nacconate" (produced by National Aniline Division Allied Chemical & Dye Corporation, New York, N.Y.).

Diisocyanates react readily with compounds containing active hydrogen atoms. These reactions usually take place quite readily at room temperatures or with only moderate heating and in the absence of catalysts, although most of the reactions are greatly accelerated by small amounts of sodium, sodium alkoxides, tertiary amines or Friedel-Crafts catalysts. Among the diisocyanates which may be used are 1,6-hexane diisocyanate, 1,4-cyclohexane diisocyanate, 2,4-tolylene diisocyanate, diphenylmethane 4,4'-diisocyanate. 3,3'-bitolylene 4,4'-diisocyanate and 3,3'-dimethyl-diphenylmethane 4,4'-diisocyanate.

The following examples are provided for illustrative purposes only:

*Example 1*

10.03 g. PVP (including about 5% $H_2O$) was mixed with 70 ml. ethylene dichloride (dry). 55 ml. was then distilled off and a viscous solution remained. To this viscous solution was then added 0.6 ml. "Nacconate 80" (a mixture of approximately 80% by weight 2,4-tolylene diisocyanate and 20% by weight 2,6-tolylene diisocyanate). This mixture was then heated to 70° C. and maintained at that temperature for 1½ hours. Thereafter, 2 ml. "Nacconate 80" were added and the mixture was stirred for 15 minutes. The mixture was then allowed to stand overnight in a closed container at ambient temperature and pressure. The resulting product was a solution containing 17 g. ethylene dichloride, about 9.5 g. PVP and 3.1 g. "Nacconate 80." This mixture contained 43% of adduct plus excess "Nacconate 80" and was soluble in methylene dichloride.

When the above mixture was exposed to air overnight it formed a brittle resin which could be easily powdered and which was water-insoluble.

*Example 2*

950 mg. of the resin formed by the process of Example 1 was mixed with 50 mg. iodine and the mixture was permitted to stand overnight in a closed bottle at 70° C. A resin-iodine complex was obtained in the form of a light yellow powder. A small amount of iodine was present in a form which was readily titrated. However, additional iodine remained in the complex, undetected by starch.

In order to analyze the amount of iodine present in the complex, a procedure was followed consisting of triturating the iodine-resin complex was excess thiosulfate, methyl alcohol and water and then titrating with a standard iodine solution using starch indicator. By this procedure, 0.237 g. of the complex analyzed 2.7% by weight iodine. Since the theoretical value is 5.0%, there was a loss of about 45%.

This resin-iodine complex is extremely useful as a water-insoluble germicidal agent. For example, it can be utilized in pools, reservoirs, wells, running streams, etc. to purify the water by means of the bound iodine while being retained from going into solution. It is therefore both safe and economical to use. Other halogens may be substituted for the iodine to form a similar complex.

*Example 3*

30 g. of PVP were mixed with 250 ml. ethylene dichloride. 205 ml. were then distilled off and 3 ml. "Nacconate 80" were added. The mixture was then stirred at 70° C. for 1½ hours, after which sufficient methylene chloride was added to form a polymer solution containing 60 g. ethylene dichloride, 30 g. PVP, 3.6 g. "Nacconate 80" and 24 g. methylene chloride. This solution contained about 28% by weight solids.

To 2 g. of the above polymer solution (containing 28% or 0.25 g. solids) was added 2 ml. methylene chloride and 300 mg. of a plasticizer. This plasticizer comprised the reaction product of "Ethomeen 18/25" (produced by Armour & Co., Chicago, Ill.), reacted with methyl iodide. The "Ethomeen 18/25" contains stearyl amine which has been ethoxylated so that there are 15 mols of ethylene oxide for each mol of stearyl amine. This product, when treated with a methyl halide such as methyl iodide, results in the formation of a quaternary ammonium halide, such as the iodide, and it is this latter product which served as the plasticizer.

The mixture of the polymer solution and the plasticizer results in the formation of a thin, pliable, transparent film which is relatively water-insoluble, non-hygroscopic and, because of the quaternary ammonium component, antiseptic. Furthermore, the film is capable of very tight complexing with halogens such as iodine to form an effective biocidal agent.

*Example 4*

An effective hair spray was formed with the polymer solution of Example 3 in the following manner:

2 g. of polymer solution of Example 3 (containing 28% by weight solids) were mixed with 300 mg. of the plasticizer of Example 3 and to this mixture was added 25 ml. methylene chloride and 13 ml. "Freon 12" (dichlorodifluoromethane, $CCl_2F_2$, produced by E. I. du Pont de Nemours & Co., Wilmington, Del.). Some precipitate was formed but was redissolved with 10 ml. methylene chloride. When this composition is sprayed on the hair, it results in an adherent, non-hygroscopic, antiseptic coating.

*Example 5*

An aerosol formulation similar to that of Example 4 may be used for creating powdery snow-like effects merely by eliminating the plasticizer. A preferred formulation of this type was prepared as follows:

2 g. polymer solution, as set forth in Example 3 (28% by weight solids), was mixed with 25 ml. methylene chloride and 10 ml. "Freon 12" at Dry Ice temperature. A homogeneous solution was formed at this temperature. By using a proper adjustment of the dispensing valve on a sealed container containing the aforesaid homogeneous solution, an adherent, white, powder was propelled from the container.

*Example 6*

An effective abrasive suitable for dentifrices was prepared as follows:

30 g. PVP (containing about 1 g. $H_2O$) was mixed with 250 ml. dry ethylene chloride. 205 ml. was then distilled off leaving 47 g. of solvent. 3 ml. "Nacconate 80" was then added and the mixture was stirred for 1½ hours at 70° C.; 35 g. methylene chloride was then added to the mixture. The final product contained 25 g. PVP, 47 g. ethylene chloride, 3.6 g. "Nacconate 80" and 35 g. methylene chloride for a total weight of 114.6 g. Of this total, the solids comprised 32.6 g. (PVP and "Nacconate 80") or 28.5% by weight. When the solvent was removed, the residue was ground to a 200 mesh powder.

*Example 7*

A highly insoluble product which, when tested, proved to be insoluble not only in water but in all of the ordinary organic solvents such as acetone, ethylene dichloride, methyl pyrrolidone, etc., was prepared by the transesterification of PVP/VA having a ratio of 30/70, using sodium methoxide as the catalyst, and then reacting the resultant material with "Nacconate 80" in the manner set forth in Example 3. The resultant product was a light brown resinous material. Alternatively, HCl may be used as the catalyst.

The PVP/VA copolymers have varying sensitivity to water depending on the relative proportions of the polyvinylpyrrolidone and the vinyl acetate. Generally, the higher the proportion of the polyvinylpyrrolidone the greater the sensitivity to water. This water sensitivity may be controlled by first hydrolyzing off some of the acetate groupings and then treating the resultant partially hydrolyzed material with diisocyanates. This decreases the water-sensitivity of the original copolymer. By using copolymers of progressively higher polyvinylpyrrolidone content, the water-sensitivity of the final product is increased. On the other hand, by increasing the hydrolysis time, the water sensitivity is decreased. This type of product, wherein the PVP/VA copolymer is only partially hydrolyzed, has been found to be highly effective in the formation of films which will adhere very well to human nails but is easily removable from the surrounding skin to which it may have been inadvertently applied. This is illustrated by the following examples:

*Example 8*

59 g. PVP/VA in a proportion of 30/70 was mixed with 30 ml. methanol and 1 ml. concentrated HCl and the mixture was permitted to stand for 16 hours at room temperature. It was then distilled with dry ethylene dichloride until the distilling temperature reached 84° C. At this time the mixture was in the form of a relatively thick syrup. The mixture was then mixed with 3 ml. of "Nacconate 80" and was maintained for a period of 2 hours at a temperature of 70° C. Thereafter, sufficient dry ethylene dischloride was added to make a total weight for the composition of 90 gms. This composition formed a film which, when applied to finger nails, adhered firmly thereto and neither ran, peeled off nor was removed when the fingers were subjected to water in ordinary usage.

*Example 9*

An aerosol formulation to permit application of the nail polish of Example 8 by spraying is prepared by mixing 3 g. of the composition of Example 8 with 35 ml. methylene chloride and 10 ml. "Freon 12." This sprayable composition adheres firmly to the nails.

Obviously many modifications and variations of the present invention are possible in the light of the above teaching. It is, therefore, to be understood that within the scope of the appended claims, the invention may be practiced otherwise than as specifically described.

The invention claimed is:

1. The reaction product formed by heating a mixture of an organic diisocyanate and a member of the group consisting of anhydrous polyvinylpyrrolidone and anhydrous hydrolyzed vinylpyrrolidone/vinyl acetate copolymer to a temperature of between about room temperature and 70° C. until a polymer solution is formed.

2. The reaction product of claim 1 wherein the organic diisocyanate is selected from the group consisting of 1,6-hexane diisocyanate, 1,4-cyclohexane diisocyanate, 2,4- tolylene diisocyanate, 2,6-tolylene diisocyanate, 3,3-bitolylene 4,4'-diisocyanate and 3,3'-dimethyldiphenylmethane 4,4'-diisocyanate.

3. A product consisting of a complex of a halogen and the reaction product formed by heating a mixture of an organic diisocyanate with a member of the group consisting of anhydrous polyvinylpyrrolidone and anhydrolyzed vinylpyrrolidone/vinyl acetate copolymer to a temperature of between about room temperature and 70° C. until a polymer solution is formed.

4. A substantially water-insoluble, non-hygroscopic, pliable, transparent film consisting of (1) the reaction product formed by heating a mixture of anhydrous polyvinylpyrrolidone and an organic diisocyanate to a temperature of between about room temperature to 70° C. until a polymer solution is formed, and (2) a plasticizer for said reaction product.

5. The reaction product of claim 1 wherein the anhydrous vinylpyrrolidone/vinyl acetate copolymer is partially hydrolyzed.

References Cited by the Examiner

UNITED STATES PATENTS

| | | | |
|---|---|---|---|
| 2,195,971 | 4/40 | Peter | 167—85 |
| 2,215,898 | 9/40 | Anderson | 167—85 |
| 2,580,808 | 1/52 | Marks et al. | 210—62 |
| 2,662,885 | 12/53 | Kamlet | 210—62 |
| 2,667,473 | 1/54 | Morner | 260—88.3 |
| 2,719,831 | 10/55 | Craemer | 260—88.3 |
| 2,739,922 | 3/56 | Shelanski | 167—17 |
| 2,793,980 | 5/57 | Mamlok et al. | 167—87 |
| 2,919,193 | 12/59 | Berntsson | 99—48 |
| 2,926,157 | 2/60 | Leclercq et al. | 260—77.5 |
| 2,953,498 | 9/60 | Werner | 167—87 |
| 3,003,919 | 10/61 | Broge | 167—93 |
| 3,010,910 | 11/61 | Gauchard | 252—305 |
| 3,028,367 | 4/62 | O'Brien | 260—77.5 |
| 3,060,098 | 10/62 | Gershon | 167—93 |
| 3,061,439 | 10/62 | Stone | 99—48 |
| 3,068,179 | 12/62 | Farnsworth et al. | 252—305 |

OTHER REFERENCES

Chemical Abstracts, vol. 53, entry 1200c, 1959 (citing Iwakura et al., Yuri Gosei Kagaku Koyokai Shi, vol. 16, pages 533–6, 1958).

LEON J. BERCOVITZ, *Primary Examiner.*

MORRIS O. WOLK, J. MARCUS, DONALD E. CZAJA,
*Examiners.*